United States Patent
Arias Prada et al.

(10) Patent No.: US 10,093,845 B2
(45) Date of Patent: Oct. 9, 2018

(54) ENHANCED ACID SOLUBLE WELLBORE STRENGTHENING SOLUTION

(71) Applicant: M-I L.L.C., Houston, TX (US)

(72) Inventors: Jorge Arias Prada, Katy, TX (US); Steven Philip Young, Cypress, TX (US); Quanxin Guo, Sugar Land, TX (US); John D. Moffitt, Sugar Land, TX (US)

(73) Assignee: M-I L.L.C., Houston, TX (US)

(*) Notice: Subject to any disclaimer, the term of this patent is extended or adjusted under 35 U.S.C. 154(b) by 0 days.

(21) Appl. No.: 14/412,642

(22) PCT Filed: Jul. 1, 2013

(86) PCT No.: PCT/US2013/048938
§ 371 (c)(1),
(2) Date: Jan. 2, 2015

(87) PCT Pub. No.: WO2014/008191
PCT Pub. Date: Jan. 9, 2014

(65) Prior Publication Data
US 2015/0166869 A1    Jun. 18, 2015

Related U.S. Application Data

(60) Provisional application No. 61/787,263, filed on Mar. 15, 2013, provisional application No. 61/787,807, filed on Mar. 15, 2013, provisional application No. 61/667,179, filed on Jul. 2, 2012.

(51) Int. Cl.
| | |
|---|---|
| E21B 43/16 | (2006.01) |
| C09K 8/42 | (2006.01) |
| C09K 8/575 | (2006.01) |
| E21B 21/00 | (2006.01) |
| E21B 33/138 | (2006.01) |
| C09K 8/03 | (2006.01) |
| C09K 8/50 | (2006.01) |
| C09K 8/516 | (2006.01) |

(52) U.S. Cl.
CPC ............... *C09K 8/424* (2013.01); *C09K 8/03* (2013.01); *C09K 8/42* (2013.01); *C09K 8/426* (2013.01); *C09K 8/50* (2013.01); *C09K 8/516* (2013.01); *C09K 8/5758* (2013.01); *E21B 21/003* (2013.01); *E21B 33/138* (2013.01); *E21B 43/16* (2013.01); *C09K 2208/08* (2013.01)

(58) Field of Classification Search
CPC ....... E21B 21/003; E21B 21/00; C09K 8/426; C09K 8/5758
USPC .............................. 166/305.1, 281, 285, 279
See application file for complete search history.

(56) References Cited

U.S. PATENT DOCUMENTS

| | | | | |
|---|---|---|---|---|
| 5,222,558 | A * | 6/1993 | Montgomery | C09K 8/572 166/278 |
| 5,251,697 | A * | 10/1993 | Shuler | C09K 8/572 166/268 |
| 2003/0195120 | A1* | 10/2003 | Halliday | C09K 8/16 507/140 |
| 2008/0110527 | A1 | 5/2008 | Keese et al. | |
| 2010/0152070 | A1 | 6/2010 | Ghassemzadeh | |
| 2010/0193244 | A1 | 8/2010 | Hoskins | |
| 2010/0230164 | A1 | 9/2010 | Pomerleau | |
| 2011/0278006 | A1 | 11/2011 | Sanders et al. | |
| 2012/0285692 | A1* | 11/2012 | Potapenko | E21B 21/003 166/308.1 |
| 2013/0112414 | A1* | 5/2013 | Kumar | C09K 8/03 166/300 |

OTHER PUBLICATIONS

International Search Report and Written Opinion for corresponding PCT Application No. PCT/US2013/048938 dated Sep. 25, 2013, 14 pages.

* cited by examiner

*Primary Examiner* — Silvana C Runyan
(74) *Attorney, Agent, or Firm* — David J. Smith

(57) ABSTRACT

Wellbore fluid compositions containing a base fluid; at least one synthetic fiber; and a particulate solid; where one or more of the at least one synthetic fiber and the particulate solid are completely or substantially acid soluble are provided. In another aspect, methods of reducing loss of wellbore fluid in a wellbore to a formation are provided, including: introducing into the wellbore a fluid composition comprising one or more synthetic fibers and one or more particulate solids.

22 Claims, No Drawings

ENHANCED ACID SOLUBLE WELLBORE STRENGTHENING SOLUTION

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Wellbore fluids may also be used to provide sufficient hydrostatic pressure in the well to prevent the influx and efflux of formation fluids and wellbore fluids, respectively. When the pore pressure (the pressure in the formation pore space provided by the formation fluids) exceeds the pressure in the open wellbore, the formation fluids tend to flow from the formation into the open wellbore. Therefore, the pressure in the open wellbore is typically maintained at a higher pressure than the pore pressure. While it is highly advantageous to maintain the wellbore pressures above the pore pressure, on the other hand, if the pressure exerted by the wellbore fluids exceeds the fracture resistance of the formation, a formation fracture and thus induced mud losses may occur. Further, with a formation fracture, when the wellbore fluid in the annulus flows into the fracture, the loss of wellbore fluid may cause the hydrostatic pressure in the wellbore to decrease, which may in turn also allow formation fluids to enter the wellbore. As a result, the formation fracture pressure typically defines an upper limit for allowable wellbore pressure in an open wellbore while the pore pressure defines a lower limit. Therefore, a major constraint on well design and selection of drilling fluids is the balance between varying pore pressures and formation fracture pressures or fracture gradients though the depth of the well.

Wellbore fluids are circulated downhole to remove rock, and may deliver agents to combat the variety of issues described above. Fluid compositions may be water- or oil-based and may comprise weighting agents, surfactants, proppants, viscosifiers, fluid loss additives, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole.

Lost circulation is a recurring drilling problem, characterized by loss of drilling mud into downhole formations. However, in addition to drilling fluids, lost circulation may remain an issue for other wellbore fluids such as including completion, drill-in, production fluid, etc. Fluid loss can occur naturally in earthen formations that are fractured, highly permeable, porous, cavernous, or vugular. These earth formations can include shale, sands, gravel, shell beds, reef deposits, limestone, dolomite, and chalk, among others.

Lost circulation may result from induced pressure during drilling. Specifically, induced mud losses may occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of nearby zones composed of weakly consolidated sands and silts. Another unintentional method by which lost circulation can result is through the inability to remove low and high gravity solids from fluids. Without being able to remove such solids, the fluid density can increase, thereby increasing the hole pressure, and if such hole pressure exceeds the formation fracture pressure, fractures and fluid loss can result.

Various methods have been used to restore circulation of a drilling fluid when a lost circulation event has occurred, particularly the use of lost circulation material (LCM) to seal or block further loss of circulation. These materials may generally be classified into several categories: surface plugging, interstitial bridging, and/or combinations thereof. In addition to traditional LCM pills, polymers that crosslink or absorb fluids and cement or gunk squeezes have also been employed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to wellbore fluid compositions containing a base fluid; at least one synthetic fiber; and a particulate solid; where one or more of the at least one synthetic fiber and the particulate solid are completely or substantially acid soluble.

In another aspect, embodiments of the present disclosure are directed to methods of reducing loss of wellbore fluid in a wellbore to a formation, including: introducing into the wellbore a fluid composition comprising one or more synthetic fibers and one or more particulate solids.

In yet another aspect, embodiments of the present disclosure are directed to methods of reducing loss of wellbore fluid in a wellbore to a formation, including: introducing into the wellbore a fluid composition comprising one or more synthetic fibers; and introducing a second fluid composition comprising one or more particulate solids.

Other aspects and advantages of the invention will be apparent from the following description and the appended claims.

DETAILED DESCRIPTION

Embodiments disclosed herein relate to engineered fluid loss control and wellbore strengthening compositions. In particular, embodiments disclosed herein relate to fluid compositions that may enter weakly consolidated intervals of the formation, leaving behind a filtercake, plug, or seal that reduces the loss of fluids into the formation.

By plugging porous or vugular zones of the formation, fluid compositions containing engineered combinations of fibrous materials may provide an immediate blockage, preventing further fluid loss and facilitating further drilling operations. By utilizing the unique properties of three-dimensional shapes of the fibrous materials and the combination of fiber types, the materials may interact synergistically to form a seal that arrests the flow of wellbore fluids into the formation. As used herein, the terms "fiber" and "fibrous" are used to denote a high aspect ratio molecular or macromolecular structure, which may have a length greater than either its diameter or width.

Without being limited by any particular theory, it is believed that as fibrous materials present in the fluid composition enter fractures in the formation, the fibers trap and entangle other particles present in the surrounding fluid, creating an impermeable barrier that prevents further fluid loss to the formation. These fibers may act to create a heterogeneous three-dimensional network that can trap particulates of varying sizes, generating a filtercake that prevents fluid flow in or out of the wellbore. Because of the interweaving of the network created by synthetic fibers and particulate solids, a synergistic effect is achieved where reduced amounts of each of the individual components are necessary to reduce fluid losses downhole and/or strengthen the formation. In addition, the overall reduction of materials incorporated into the fluids allows the formulation of a wellbore fluid effective in preventing fluid loss and/or strengthen the formation that is still pumpable through standard delivery means such as drill strings and coiled tubing, as opposed to specialized delivery methods normally required to emplace concentrated slurries in thief zones or fluid loss sites.

In embodiments, the fluid composition may include a synthetic fiber and a particulate solid. In other embodiments, fluid compositions may include a number of other additives known to those of ordinary skill in the art of wellbore fluid formulations, such as wetting agents, viscosifiers, surfactants, dispersants, interfacial tension reducers, pH buffers, mutual solvents, thinners, thinning agents, gelling agents, rheological additives and cleaning agents.

In some embodiments, wellbore fluid compositions in accordance with the instant disclosure may be applied to an interval of a wellbore as a fluid "pill." As used herein, the term "pill" is used to refer to a relatively small quantity (typically less than 200 bbl) of a special blend of wellbore fluid to accomplish a specific task that the regular wellbore fluid cannot perform. In one specific embodiment, the fluid composition may be used to plug thief zones or other regions where circulating fluids are being lost into the formation.

Upon emplacement within the wellbore, a pill may be defluidized and lose a substantial portion of the base fluid to the formation such materials present in the pill form a plug or seal having sufficient compressive and shear strength for the particular application. Advantageously, upon placing the pill in the wellbore, the pill may be defluidized to lose a substantial portion of the base fluid to the formation such that the fiber blend of the present disclosure may form a plug or seal having sufficient compressive strength for the particular application, and which may increase the tensile strength of the rock.

In one or more embodiments, the wellbore fluid composition may be completely or at least partially acid soluble, allowing placement during drilling operations and then subsequently removed prior to completion operations, for example. Specifically, according to embodiments, one or more of the components may be substantially acid soluble. As used herein, "acid soluble" refers to the ability of a material to dissolve in/upon contact with an acid. "substantially acid soluble" is defined to mean that at least 50%, at least 75%, or at least 85% of a given component will dissolve in/upon contact with an acid. The selection of fibers may have a significant effect on the efficiency of the fluid compositions in both performance (e.g., defluidization rate and/or resulting plug strength) and acid solubility.

Synthetic Fibers

One or more embodiments may incorporate at least one synthetic fiber type into the fluid composition. In particular embodiments, the synthetic fibers may include high aspect ratio polymeric fibers.

The diameter of the synthetic fiber has been identified as parameter that may determine both the performance of the synthetic fiber as a lost circulation material, and a variable that may be used to tune the rate of dissolution of the fiber upon exposure to acidic media. As an example, the denier of the nylon fiber, which is the mass in grams of 9,000 meters of a selected fiber, may be used as a guide for determining the acid solubility of the fiber. For example, a higher denier nylon may be more soluble than a lower denier nylon. For example, in various embodiments, a denier of at least 2, 4, 6, or 8 may be selected. In other embodiments, the diameter of the synthetic fibers may fall within the range of 0.1 µm to 60 µm. In other embodiments, the fiber diameter may range from any lower limit selected from the group of 0.5 µm, 1 µm, 5 µm, and 10 µm to an upper limit selected from the group of 10 µm, 15 µm, 20 µm, and 50 µm.

Also affecting acid solubility may be temperature. For example, a sample may have a relatively low acid solubility at room temperature, but upon exposure to elevated temperatures, such as 100° C. and greater, the solubility may be increased to substantially or completely soluble. Thus, whether a component is acid soluble may include acid solubility at elevated temperatures.

In some embodiments, acid soluble synthetic fibers may include polyamides such as nylon 6, nylon 6,6, and combinations thereof In other embodiments, the synthetic fibers may be selected from polyamides, polyesters, polyaramids, polyethylene terephthalate, polytriphenylene terephthalate, polybutylene terephthalate, polylactic acid, poly(lactic-co-glycolic acid), polyglycolic acid, poly(ε-caprolactone) and combinations thereof.

The one or more synthetic fibers may be added to the fluid composition in an amount ranging from a lower limit selected from the group of 0.25 ppb, 0.5 ppb, 1 ppb, 3 ppb, and 5 ppb to an upper limit selected from the group of 5 ppb, 8 ppb, 10 ppb, 15 ppb, and 20 ppb. In some embodiments; however, more or less may be desired depending on the particular application and downhole conditions.

In one or more embodiments, the length of the fibers may be kept below a length of 8 mm or the composition may become undesirably viscous and unpumpable through standard wellbore fluid delivery means. In one or more embodiments, the fibers may range in length from any lower limit selected from 0.5 mm, 1 mm, 3 mm, and 5 mm to any upper limit selected from 3 mm, 5 mm, 6 mm, and 7 mm.

Particulate Solids

Wellbore fluid formulations in accordance with the present disclosure include particulate solids that may interact in concert with the synthetic fiber to reduce fluid loss by incorporating into the interstitial spaces of a network created by the synthetic fiber. Particulate solids that may be used in accordance with the present disclosure may include any material that may aid in weighting up a fluid to a desired density, including the use of particles frequently referred to in the art as weighting materials, as well as particulates known in the art as lost circulation materials.

Particulate solids may be selected from one or more of the materials including, for example, barium sulfate (barite), ilmenite, hematite or other iron ores, olivine, siderite, and strontium sulfate. Other examples include graphite, calcium carbonate (preferably, marble), dolomite ($MgCO_3.CaCO_3$), celluloses, micas, proppant materials such as sands, ceramic particles, diatomaceous earth, calcium silicates, nut hulls, and combinations thereof. It is also envisaged that a portion of the particulate solids may comprise drill cuttings having an average particle diameter in the range of 25 to 2000 microns. In other embodiments, the particulate weighting agent may be composed of an acid soluble material such as calcium carbonate (calcite), magnesium oxide, dolomite, and the like. One having ordinary skill in the art would recognize that selection of a particular material may depend largely on the density of the material as typically, the lowest wellbore fluid viscosity at any particular density is obtained by using the highest density particles.

Particulate solids may comprise substantially spherical particles; however, particulate solids may also comprise elongate particles, for example, rods or ellipsoids, as well as flat or sheet-like particles. Where the particulate solids comprise elongate particles, the average length of the elongate particles should be such that the elongate particles are capable of entering the induced fractures at or near the mouth thereof. Typically, elongate particles may have an average length in the range 25 to 3000 microns, or 50 to 1500 microns in some embodiments, and 250 to 1000 microns in yet other embodiments.

The particle size of the particulate solids may be selected depending on the particular application, the level of fluid loss, formation type, and/or the size of fractures predicted for a given formation. The size may also depend on the other particles selected for use in the fluid composition. In one or more embodiments, the particulate solids may have an average diameter that ranges from a lower limit selected from the group of 100 μm, 250 μm, 500 μm, and 750 μm to an upper limit selected from the group of 400 μm, 500 μm, 750 μm, 1000 μm, 1500 μm, and 2000 μm, and 3000 μm. In particular embodiments, combinations of particulate solids having different average size ranges may be combined in a single fluid composition.

The amount of particulate solid present in the fluid composition may also depend on the fluid loss levels, the anticipated fractures, the density limits for a given wellbore and/or pumping limitations, etc. In some embodiments, the particulate solids may be added to the wellbore fluid compositions such that the final density of the fluid may range from 9 ppg up to 23 ppg in some embodiments; however, more or less may be desired depending on the particular application.

In one or more embodiments, the ratio of the synthetic fibers to particulate solids may be controlled such that the fluid compositions have a comparative weigh percent (wt %) of synthetic fibers to particulate solids [100×(weight synthetic fibers/weight particulate solids)] that ranges from a lower limit selected from the group of 0.25 wt %, 0.5 wt %, and 1 wt % to an upper limit selected from the group of 1 wt %, 3 wt %, 5 wt %, and 7 wt %.

Base Fluids

The base fluid may be an aqueous fluid or an oleaginous fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts. Additionally, brines that may be used in the pills disclosed herein may be natural or synthetic, with synthetic brines tending to be much simpler in constitution. In one embodiment, the density of the pill may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oleaginous fluid may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. Selection between an aqueous fluid and an oleaginous fluid may depend, for example, the type of drilling fluid being used in the well when the lost circulation event. Use of the same fluid type may reduce contamination and allow drilling to continue upon plugging of the formation fractures/fissures, etc.

While fluid compositions may stop losses when drilling a well, they may also introduce limitations that hinder operations later at the production stage. In embodiments described herein, wellbore fluid compositions may be formulated from acid soluble components such that the compositions may form a seal having high shear strength in a downhole fracture, but be removed at a later time with the application of an acidic treatment such as a breaker fluid. Further, based on the presence of acid soluble components in the wellbore fluid compositions, the filtercake or seal formed on the wellbore walls may be removed by an acid wash. Thus, the formulation of the present disclosure may be particularly desirable for use when drilling through a producing region of the well and fluid losses are experienced. The fluid composition may be pumped into the well to seal off the formation, so that further drilling and/or completion operations may continue. Upon conclusion of all completion operations, the circulation of an acid washes known in the art such as hydrochloric acid, sulfuric acid, citric acid, formic acid, acetic acid, or mixtures thereof may be used to at least partially dissolve some of the filtercake remaining on the wellbore walls. Upon cleanup of the well, the well may then be converted to production.

Wellbore fluids compositions may be added in a discrete amount, for example as a pill, or added continuously until lost circulation is reduced to an acceptable level. When formulated as a pill, the wellbore fluid compositions are preferably spotted adjacent to the location of the lost circulation using methods known in the art. Spotting may be accomplished by methods known in the art. For example, the permeable formation will often be at or near the bottom of the wellbore because when the permeable formation is encountered the formation will immediately begin to take drilling fluid and the loss of drilling fluid will increase as the permeable formation is penetrated eventually resulting in a lost circulation condition. In such situations, the wellbore fluid compositions may be spotted adjacent the permeable formation by pumping a slug or pill of the slurry down and out of the drill pipe as is known in the art. It may be, however, that the permeable formation is at a point farther up in the wellbore, which may result, for example, from failure of a previous seal. In such cases, the drill pipe may be raised as is known in the art so that the pill or slug of the wellbore fluid composition may be deposited adjacent the permeable formation. The volume of the slug or pill that is spotted adjacent the permeable formation may range from less than that of the open hole to more than double that of the open hole. In some instances, it may be necessary to use more than one pill. Such need may arise when the first pill was insufficient to plug the fissures and thief zone or was placed incorrectly. Further, in some instances, the first pill may have sufficiently plugged the first lost circulation zone, but a second (or more) lost circulation zone also exists needed treatment.

In some embodiments, wellbore fluid compositions may be added and the wellbore may be sealed and pressurized to defluidize the compositions. Defluidization may be accomplished either by hydrostatic pressure or by exerting a low squeeze pressure as is known in the art. Hydrostatic pressure will complete the seal; however, a low squeeze pressure may be desirable because incipient fractures or other areas of high permeability can be thereby opened and plugged immediately, thus reinforcing the zone and reducing or avoiding the possibility of later losses. After the defluidization is completed, the drilling fluid may be re-circulated through the wellbore to deposit a filtercake on the formation seal, and drilling may be resumed. Injection of the particles into the formation may be achieved by an overbalance pressure (i.e., an overbalance pressure greater than the formation pressure). While in particular embodiments, the injection pressure may range from 100 to 400 psi, any overbalance pressure level, including less than 100 psi or greater than 400 psi may alternatively be used. The selection of the injection pressure may simply affect the level of injection of the wellbore fluid compositions into the formation.

The fibers and particulate solids are added to the treatment fluid, such as a water- or oil-based wellbore fluid, in any order with any suitable equipment to form the fluid composition. In some embodiments, the synthetic fiber and particulate solids may be added to the fluid while pumping using specialized shakers. Wellbore fluid compositions formulated with a synthetic fiber and particulate solids may be mixed before pumping downhole in some embodiments. In other embodiments, a wellbore fluid containing the synthetic fiber may be introduced into the wellbore before a second wellbore fluid containing the particulate solids or vice versa in yet other embodiments.

It is also within the scope of the present disclosure that one or more spacer pills may be used in conjunction with the pills of the present disclosure. A spacer is generally characterized as a thickened composition that functions primarily as a fluid piston in displacing fluids present in the wellbore and/or separating two fluids from each other.

EXAMPLES

The following example is provided to further illustrate the application and the use of the methods and compositions of the present disclosure. In order to assay the ability of the composition to seal fractures a number of samples were prepared containing varying solids volume fraction (SVF) of wellbore fluid compositions containing varying percentages by weight of synthetic fibers and particulate solids. Wellbore fluids were formulated as shown below in Tables 1 and 2, where the synthetic fiber is nylon. Particulate solids surveyed include G-Seal-Plus™ Coarse (GSPC), with a median particle size of 600-1000; Nut-Plug™ Coarse (NPC), with a median particle size of 1600-2000 microns; and Nut-Plug Fine™ (NPF), with a median particle size of 400-500 microns; all of which are available from MI SWACO (Houston, Tex.).

Tests were performed in a modified lost circulation cell. The cell was equipped with a cylinder approximately 50 mm high having a 5 mm slot. The experimental apparatus consisted essentially of a high-pressure, high-temperature fluid loss cell equipped with a cylinder at the bottom. Pressure was applied from the top of the cell onto sample formulations placed within the cell (as in a standard fluid loss experiments known in the art). A valve at the bottom was closed, and a cylinder having a slot was placed inside the cell. 500 mL of fiber-laden fluid was poured into the test cell, and the cell was closed and pressurized to 100 psi. Once the cell was pressurized, the bottom valve was opened quickly enough to eliminate filtration of fibers through the bottom pipe. If the slot was sealed, pressure was increased from 100 psi to 1500 psi, in steps of 50 psi. The pressure was held constant for at least 30 minutes, unless no plug formed or the plug failed. Mud loss monitored by collecting filtrate in a container. The container was placed on a balance connected to a computer, allowing one to record fluid loss over time. Formulations and results are shown below in Tables 1 and 2.

TABLE 1

Wellbore fluid formulations and results for Example 1.

Analysis of Fiber Effect (Nylon)

| SVF | LCM % | | Formulation | | | | | Test Results | | |
|---|---|---|---|---|---|---|---|---|---|---|
| | | | H2O | Nylon | GSPC | NPC | NPF | 500 psi | 1000 psi | 1500 psi |
| 7.80 | 0.50 | S.G. | 1.00 | 1.15 | 2.00 | 1.40 | 1.40 | Yes | Yes | Yes |
| | | Weight | 322.70 | 1.00 | 10.00 | 25.00 | 5.00 | | | |
| | | Volume | 322.70 | 0.87 | 5.00 | 17.86 | 3.57 | | | |
| | | W Total | 358.70 | | | | | Observations = 20% Fluid | | |
| | | V Total | 350.00 | 27.30 | | | | loss at 1500 psi | | |
| | | Weight % | | 2.44 | 24.39 | 60.98 | 12.20 | | | |
| | | Volume % | 92.20 | 3.19 | 18.32 | 65.42 | 13.08 | | | |
| 5.23 | 0.33 | S.G. | 1.00 | 1.15 | 2.00 | 1.40 | 1.40 | No | | |

TABLE 1-continued

Wellbore fluid formulations and results for Example 1.

Analysis of Fiber Effect (Nylon)

| LCM | | | Formulation | | | | | Test Results | | |
|---|---|---|---|---|---|---|---|---|---|---|
| SVF | % | | H2O | Nylon | GSPC | NPC | NPF | 500 psi | 1000 psi | 1500 psi |
| 5.48 | 0.33 | Weight | 331.69 | 1.00 | 6.60 | 16.50 | 3.30 | | | |
| | | Volume | 331.69 | 0.87 | 3.30 | 11.79 | 2.36 | | | |
| | | W Total | 355.79 | | | | | | Observations = | |
| | | V Total | 350.00 | 18.31 | | | | | No seal at all | |
| | | Weight % | | 3.65 | 24.09 | 60.22 | 12.04 | | | |
| | | Volume % | 94.77 | 4.75 | 18.02 | 64.36 | 12.87 | | | |
| | | S.G. | 1.00 | 1.15 | 2.00 | 1.40 | 1.40 | No | | |
| | | Weight | 330.82 | 2.00 | 6.60 | 16.50 | 3.30 | | | |
| | | Volume | 330.82 | 1.74 | 3.30 | 11.79 | 2.36 | | | |
| | | W Total | 355.92 | | | | | | Observations = | |
| | | V Total | 350.00 | 19.18 | | | | | Made thick filter | |
| | | Weight % | | 7.04 | 23.24 | 58.10 | 11.62 | | cake but did not | |
| | | Volume % | 94.52 | 9.07 | 17.20 | 61.44 | 12.29 | | stop fluid flow | |

TABLE 2

Wellbore fluid formulations and results for Example 1.

Analysis of Fiber Effect (Nylon)

| LCM | | | Formulation | | | | | | Test Results | | |
|---|---|---|---|---|---|---|---|---|---|---|---|
| SVF | % | | H2O | Nylon | GSPC | NPC | NPF | Barite | 500 psi | 1000 psi | 1500 psi |
| 17.17 | 0.25 | S.G. | 1.00 | 1.15 | 2.00 | 1.40 | 1.40 | 4.20 | Yes | Yes | Yes |
| | | Weight | 289.89 | 1.00 | 5.00 | 12.50 | 2.50 | 193.31 | | | |
| | | Volume | 289.89 | 0.87 | 2.50 | 8.93 | 1.79 | 46.03 | | | |
| | | W Total | 308.39 | Density | 12.00 | | | | | Observations = | |
| | | V Total | 350.00 | 60.11 | | | | | | 50% fluid loss at 1500 psi | |
| | | Weight % | | 4.76 | 23.81 | 59.52 | 11.90 | 90.62 | | | |
| | | Volume % | 82.83 | 1.45 | 4.16 | 14.85 | 2.97 | 76.57 | | | |
| 17.41 | 0.25 | S.G. | 1.00 | 1.15 | 2.00 | 1.40 | 1.40 | 4.20 | Yes | Yes | Yes |
| | | Weight | 289.06 | 2.00 | 5.00 | 12.50 | 2.50 | 193.14 | | | |
| | | Volume | 289.06 | 1.74 | 2.50 | 8.93 | 1.79 | 45.99 | | | |
| | | W Total | 308.56 | Density | 12.00 | | | | | Observations = | |
| | | V Total | 350.00 | 60.94 | | | | | | 50% fluid loss at 1500 psi | |
| | | Weight % | | 9.09 | 22.73 | 56.82 | 11.36 | 90.62 | | | |
| | | Volume % | 82.59 | 2.85 | 4.10 | 14.65 | 2.93 | 75.46 | | | |

Applicant has discovered that, by controlling the ratio of loss control materials based upon their microscopic and macroscopic shapes, improved packing within fractures and loss control performance can be obtained. Because of the interweaving of the fiber components additives and optional particulate weighting agents, reduced amounts of each of the individual components are necessary to plug fissures within the formation, with that added benefit that the resulting fluid remains pumpable thorough conventional drill strings.

Further, while not all fibers are capable of blocking fluid loss under given conditions, as the selection and use of the wrong fiber can cause great complications in mixing and pumping and ultimately with no blocking effect to cure losses, the applicant has identified materials that are both capable of reducing or eliminating fluid loss in a subterranean formation. In addition, the selected fiber materials may also be dissolved upon exposure to acid to such a degree that the seal formed by fiber blend may be partially or completely removed prior to production operations.

In cases of high fluid loss downhole, large quantities of lost circulation materials are required to seal fissures and formation. However, when lost circulation materials become sufficiently concentrated, placement of the lost circulation materials becomes more difficult because standard placement means such as drill strings and coiled tubing require that fluids be pumpable, i.e., where the viscosity is below a range where pressures required to deliver the fluids becomes too great and hazardous to onsite workers. However, Applicant has discovered that a synergistic combination of geometrically defined synthetic fibers and particulate solids may be used in instances of high fluid loss. The synergistic combination is not only effective in reducing fluid loss, but overcomes the difficulties associated with placement and decrease the total amount of materials required. Increasing the efficiency of material usage may also carry advantages in remote worksites like offshore drilling where delivery costs are a substantial concern.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. Moreover, embodiments described may be practiced in the absence of any element that is not specifically disclosed herein.

What is claimed:

1. A wellbore fluid composition comprising:
a base fluid;
at least one synthetic fiber; and
a particulate solid;
wherein one or more of the at least one synthetic fiber and the particulate solid are completely or substantially acid soluble, and
wherein the at least one synthetic fiber is added to the wellbore fluid composition at 0.25 wt % to 3 wt % of the weight of the added particulate solid;
wherein the wellbore fluid composition contains substantially no synthetic fiber having a length equal to or more than 8 mm; and
wherein the at least one synthetic fiber has a denier of at least 2.

2. The wellbore fluid composition of claim 1, wherein the base fluid comprises an oleaginous fluid.

3. The wellbore fluid composition of claim 1, wherein the base fluid comprises a non-oleaginous fluid.

4. The wellbore fluid composition of claim 1, wherein the at least one synthetic fiber has a length within the range of 4 mm to 7 mm.

5. The wellbore fluid composition of claim 1, wherein the at least one synthetic fiber has a length within the range of 5 mm to 6 mm.

6. The wellbore fluid composition of claim 1 wherein the particulate solid added to the wellbore fluid composition ranges from 5 ppb to 100 ppb.

7. The wellbore fluid composition of claim 1, wherein the particulate solid is calcium carbonate.

8. The wellbore fluid composition of claim 1, wherein the at least one synthetic fiber is nylon.

9. The wellbore fluid composition of claim 1, wherein the at least one synthetic fiber is selected from a group consisting of nylon, polyesters, polyethylene terephthalate, polytriphenylene terephthalate, polybutylene terephthalate has a diameter within the range of 5 microns to 15 microns.

10. The wellbore fluid composition of claim 1, wherein the at least one synthetic fiber has a denier of at least 4.

11. The wellbore fluid composition of claim 1, wherein the at least one synthetic fiber has a denier of at least 6.

12. The wellbore fluid composition of claim 1, wherein the at least one synthetic fiber has a denier of at least 8.

13. A method of reducing loss of wellbore fluid in a wellbore to a formation, comprising:
introducing into the wellbore a fluid composition comprising one or more synthetic fibers and one or more particulate solids, wherein the fluid composition contains the one or more synthetic fibers at 0.25 wt % to 3 wt % of the weight of the one or more particulate solid,
wherein the wellbore fluid composition contains substantially no synthetic fiber having a length equal to or more than 8 mm;
wherein the one or more synthetic fibers have a denier of at least 2.

14. The method of claim 13, wherein the method further comprises applying pressure to drive the fluid composition into the formation.

15. The method of claim 13, further comprising circulating an acid wash subsequent to the introduction of the fluid composition.

16. The method of claim 13, further comprising:
introducing at least one spacer pill is introduced into the wellbore before introducing the fluid composition.

17. The method of claim 13, further comprising:
introducing at least one spacer pill after the fluid composition is introduced into the wellbore.

18. A method of reducing loss of wellbore fluid in a wellbore to a formation, comprising:
introducing into the wellbore a fluid composition comprising one or more synthetic fibers; and
introducing a second fluid composition comprising one or more particulate solids,
wherein the one or more synthetic fibers in the fluid composition are present at 0.25 wt % to 3 wt % of the weight of the added particulate solid in the second fluid composition;
wherein the wellbore fluid composition contains substantially no synthetic fiber having a length equal to or more than 8 mm;
wherein the one or more synthetic fibers have a denier of at least 2.

19. The method of claim 18, wherein the method further comprises applying pressure to drive the fluid composition into the formation.

20. The method of claim 18, further comprising circulating an acid wash subsequent to the introduction of the fluid composition.

21. The method of claim 18, wherein the one or more synthetic fibers have a length within the range of 4 mm to 7 mm.

22. The method of claim 18, wherein the at least one synthetic fiber selected from a group consisting of nylon, polyesters, polyethylene terephthalate, polytriphenylene terephthalate, polybutylene terephthalate has a diameter within the range of 5 microns to 15 microns.

* * * * *

UNITED STATES PATENT AND TRADEMARK OFFICE
CERTIFICATE OF CORRECTION

| | | |
|---|---|---|
| PATENT NO. | : 10,093,845 B2 | Page 1 of 1 |
| APPLICATION NO. | : 14/412642 | |
| DATED | : October 9, 2018 | |
| INVENTOR(S) | : Jorge Arias Prada et al. | |

It is certified that error appears in the above-identified patent and that said Letters Patent is hereby corrected as shown below:

On the Title Page

(60) Related U.S. Application Data: Replace "61/787,263" with --61/789,263--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*